United States Patent [19]

Lapeyre, deceased et al.

[11] Patent Number: 5,181,879
[45] Date of Patent: Jan. 26, 1993

[54] METHOD AND APPARATUS FOR PROCESSING FISH INTO TRANSVERSE SECTIONS

[75] Inventors: James M. Lapeyre, deceased, New Orleans, by Noreen B. Lapeyre, Administratrix; Christopher Greve, Covington; Ronald M. O'Connor, Jefferson, all of La.

[73] Assignees: The Laitram Corporation, Harahan, La.

[21] Appl. No.: 824,006

[22] Filed: Jan. 22, 1992

[51] Int. Cl.⁵ .............................................. H22C 25/18
[52] U.S. Cl. ..................................................... 452/160
[58] Field of Search .............. 452/160, 161, 151, 152, 452/155, 157, 162, 187

[56] References Cited

U.S. PATENT DOCUMENTS

| | | | |
|---|---|---|---|
| 3,593,370 | 7/1971 | Lapeyre | 17/52 |
| 3,594,191 | 7/1971 | Lapeyre | 432/155 |
| 3,675,273 | 7/1972 | Vidjak | 17/61 |
| 3,800,363 | 4/1974 | Lapeyre | 17/52 |
| 4,557,019 | 12/1985 | Van Deuanter et al. | 452/157 |
| 4,726,094 | 2/1988 | Braeger | 452/157 |
| 4,738,004 | 4/1988 | Lapeyre | 17/52 |
| 4,748,724 | 6/1988 | Lapeyre et al. | 17/54 |
| 4,847,954 | 7/1989 | Lapeyre et al. | 17/54 |
| 4,868,951 | 9/1989 | Akesson et al. | 452/155 |
| 4,875,254 | 10/1989 | Rudy et al. | 17/61 |
| 4,962,568 | 10/1990 | Rudy et al. | 17/52 |
| 5,061,221 | 10/1991 | Holzhüter et al. | 452/157 |

FOREIGN PATENT DOCUMENTS

| | | |
|---|---|---|
| 3819222 | 12/1989 | Fed. Rep. of Germany . |
| 1-300842 | 12/1989 | Japan . |
| 0889787 | 2/1962 | United Kingdom ............... 452/167 |
| 2218615 | 11/1989 | United Kingdom . |

*Primary Examiner*—Willis Little
*Attorney, Agent, or Firm*—Pravel, Gambrell, Hewitt, Kimball & Krieger

[57] ABSTRACT

An apparatus for processing a fish body into a plurality of transverse fish body section includes a plurality of spaced apart vertically standing work stations, each including a structural frame that supports a continuous rail or runway. The runway includes inclined sections that extend between the work station thereby defining an inclined travel path between the work stations. A wheeled carriage is movably mounted upon the runway and includes a set of spring loaded jaws for holding a fish body section to be processed. The carriage is movably mounted upon the runway so that the carriage can travel from one work station to the next in a sequential fashion. Each work station has a section of rail connected to the inclined runway which is at a lower elevation than the previous work station by a dimension which is equal to the thickness of the fish body section to be processed. Each work station may include a cutting blade such as, for example, a rotary band saw. The saws are at a constant elevation. As the fish body is moved from work station to work station it is lowered from one rail section to the next so that a series of transverse fish body sections are cut beginning with a cut at the tail area and ending with a cut just below the head. The fish to be processed are preferably preliminarily graded into groups of substantially similar size and weight so that transverse fish slabs of similar size are collected at each respective work station.

22 Claims, 5 Drawing Sheets

METHOD AND APPARATUS FOR PROCESSING FISH INTO TRANSVERSE SECTIONS

BACKGROUND OF THE INVENTION

1. Field of the Invention

The present invention relates to fish processing and more particularly to an improved method and apparatus for processing a frozen fish body into a plurality of transverse fish body sections and wherein a wheeled carriage carrying the fish body travels upon a railway that traverses a plurality of work stations, each equipped with a cutting blade that cuts a transverse fish body section from the fish body.

2. General Background

In the processing of fish such as tuna, it is common to freeze a catch of fish at sea, and to process the catch on shore. The processing normally involves thawing the fish followed by manual operations of slitting the fish belly and removing the viscera. The visceral cavity is then washed with water, and the tuna inspected for spoilage. The tuna is then usually cooked whole in a batch type operation.

Manual prior art methods of processing tuna are described in greater detail in U.S. Pat. No. 3,594,191 issued to J. M. Lapeyre, an applicant herein. The '191 Lapeyre patent discloses the concept of cutting the tuna in sections at spaced intervals and thereafter separating the edible loin portions to provide discrete cannable portions. A later U.S. Pat. No. 3,593,370 entitled "Method of Butchering Tuna" issued to J. M. Lapeyre, describes a method for processing such transverse tuna sections while frozen. The method of butchering frozen tuna described in the '370 Lapeyre patent includes the subdivision of the whole fish into a plurality of transverse cross-sections and subsequently subdividing the cross-sections into frozen segments. The junctures between the segments are along lines generally parallel to the longitudinal axis of the fish and to the backbone thereof. Each transverse fish section is skinned and the skinned sections operated on to effect a separation of the scrap parts of the sections from the loin meat parts, while the latter were still in at least a partially frozen condition.

U.S. Pat. No. 3,800,363 issued to J. M. Lapeyre entitled "Tuna Butchering Method and System", and U.S. Pat. No. 4,738,004 also issued to J. M. Lapeyre, entitled "Tuna Butchering Method" describe butchering methods and systems for separating the edible loin portions of transverse tuna slices provided by subdivision of a frozen whole tuna. U.S. Pat. Nos. 3,594,191; 3,593,370; 3,800,363; and 4,738,004 are incorporated herein by reference.

One of the problems not addressed in any of the above-referenced Lapeyre patents is the problem of high speed, high volume processing of fish bodies (usually frozen) while maintaining precise transverse cuts and precise dimensions between cuts to give usable transverse sections of consistent thickness even when the fish bodies vary greatly in size and shape. In the processing of a high volume of tuna, for example, the fish bodies are normally received in a frozen state, are often misshapen and of varying sizes. In any attempt to process a high volume of frozen fish into transverse fish body sections, the differential sizes present a problem. A processing "machine" will typically not "know" the size of the fish being processed at any given time if an inexpensive "machine" is being used to cut the fish in an automated, high speed fashion. For example, one fish might weigh ten (10) pounds and be twenty-four (24) inches long while the next fish being processed might be thirty (30) pounds and thirty-five (35) inches long. This problem is aggravated when a very high delivery rate removes any chance for an interim adjustment between fish.

Another problem when attempting to cut the fish into transverse fish body sections is that the fish being processed are usually frozen and are difficult to grip and support in the same position at all times. Any slight shift of the fish position can reduce precision in the cutting operation.

Another problem of processing a large volume of fish of differing sizes which are frozen is the problem of gripping each fish in such a way as not to damage the fish yet hold it securely. In any manufacturing or processing plant, a fish would be difficult to hold if frozen. An additional problem is the variation in temperature which exists between the fish body and the equipment being used to support it. The flow of heat between equipment and fish could cause the fish to thaw prematurely or at least to partially thaw, making a holding of the fish not only difficult but unpredictable, possibly creating damage to the fish.

SUMMARY OF THE PRESENT INVENTION

The present invention solves the prior art problems and shortcomings in a simple, straightforward yet effective manner by providing a method and apparatus for processing a fish body, while frozen, into a plurality of transverse fish body sections. The apparatus includes a plurality of spaced apart work stations, each including an upstanding structural frame.

A moving carriage is provided with jaws for movably supporting a fish body to be processed with respect to the work stations, preferably upon an elongated runway which spans the work stations. A cutting apparatus is preferably associated with each work station and mounted upon the support frame so that a transverse cut can be made through the fish body to be processed at each work station as the carriage traverses sequentially through each work station.

In the preferred embodiment, the fish is vertically supported and travels in a vertical plane while each cutting blade occupies a horizontal plane that intersects the vertical plane at right angles so that when the fish traverses each cutter a precise transverse cut is made. The carriage can be powered to overcome resistance to cutting as the fish body engages the cutting assembly.

According to one embodiment, the runway is preferably stepped so that the fish body is positioned in a slightly lower elevational position at each work station. In this manner multiple transverse cuts are made respectively at the various work stations and along the same fish body beginning, for example, at its tail end portion and ending at its head end portion. Furthermore, by stepping the runway, all of the cutting apparatus can be mounted to the frames at the same height for ease of manufacture, operation, and maintenance.

In the preferred embodiment, the cutting assembly includes a cutting blade mounted upon the frame. The carriage preferably includes a pair of spaced apart opposed jaws, each including multiple jaw portions of high heat transfer material (e.g., metal) which are insulated with a low heat transfer barrier (e.g., plastic) to control heat transfer between the fish body and the metallic jaws.

In the preferred embodiment a plurality of spaced apart work stations are provided, each including its own upstanding structural support frame and the continuous runway extends between the work stations to define a travel path between the work stations. The carriage is movably mounted upon the runway so that the carriage can traverse the runway from one work station to the next. In the preferred embodiment, each of the plurality of work stations includes its own cutting assembly for making a single transverse cut across a particular fish body section so that a single transverse fish body section is cut from each fish body as it traverses from one work station to the next.

In the preferred embodiment, the fish body is supported in a generally vertical position during the cutting, and preferably with the head in an uppermost position and the tail in a lowermost position.

In the preferred embodiment, each work station includes a runway section receptive of the carriage which has a different lower elevational position than the previous work station runway section. Inclined runway sections connect the work station runway sections to define the continuous runway. In the preferred embodiment, the runway is formed of, for example, a pair of spaced apart rails and each carriage has wheels that register upon the rails for travel thereupon. In the method of the present invention, fish bodies could be similarly grouped or graded prior to cutting so that generally uniform transverse sections are deposited at each respective work station. Thus, the improved method of the present invention provides transverse fish sections which are automatically grouped at the respective work stations which eases further processing.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
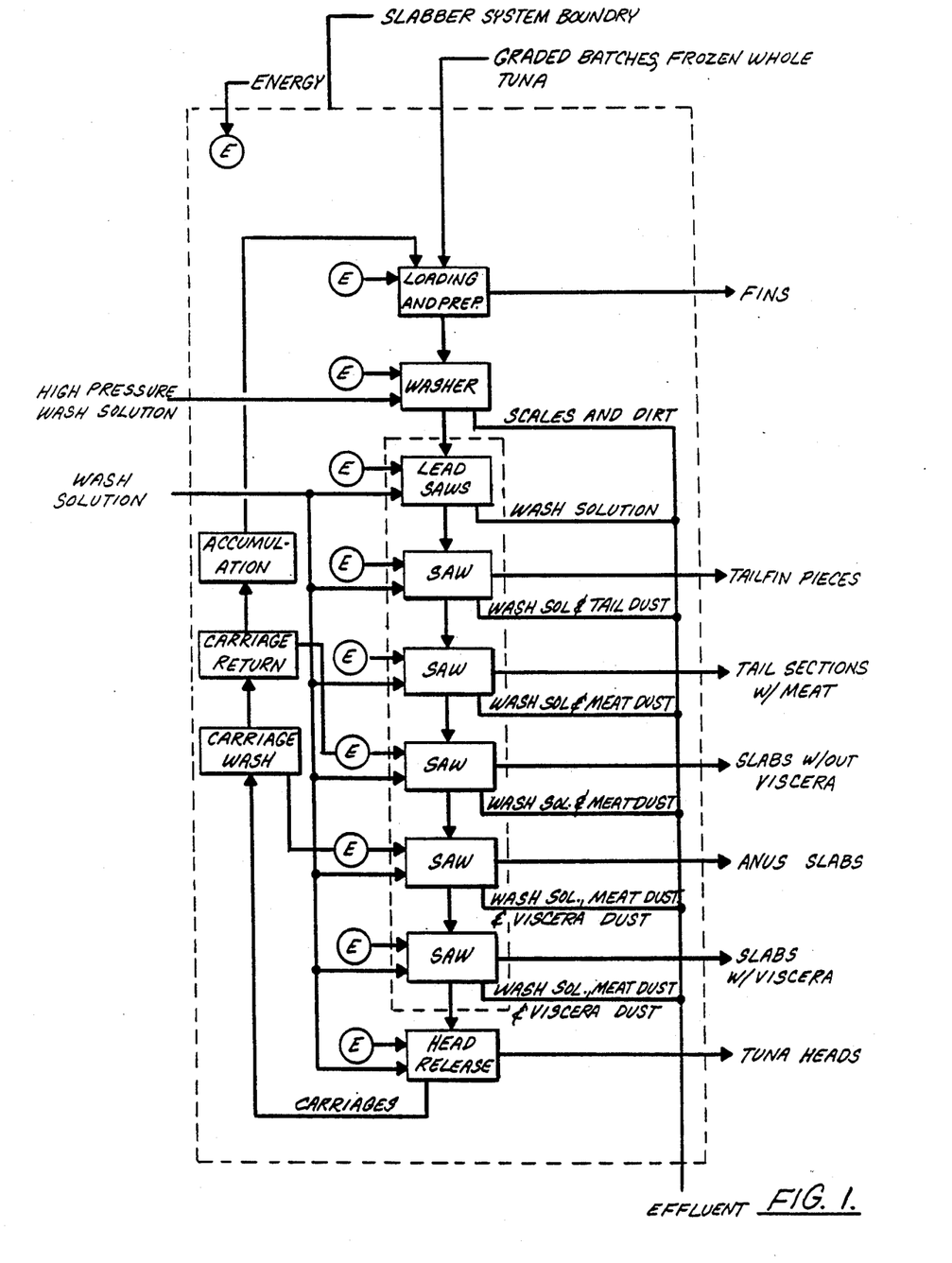
FIG. 1 is an overall schematic view illustrating a flow chart of the preferred method of the present invention.
Figure 2:
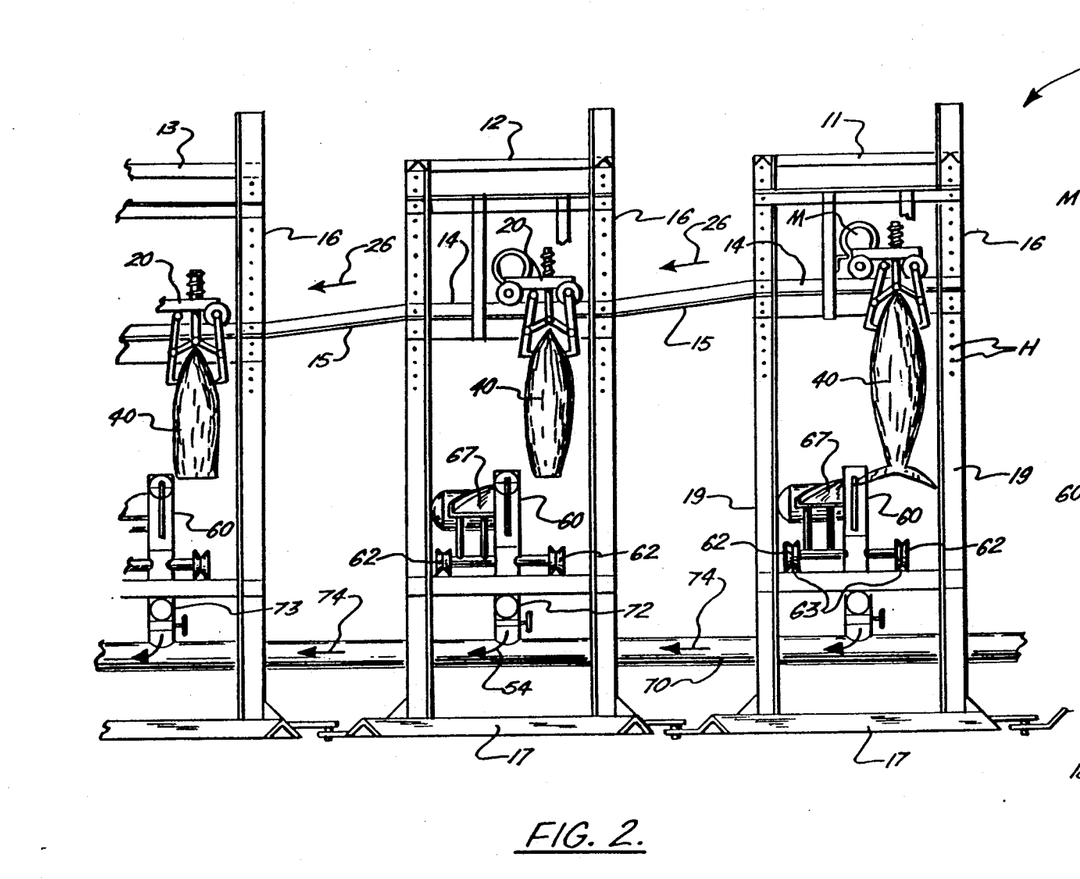
FIG. 2 is a side elevational view of the preferred embodiment of the apparatus of the present invention.
Figure 3:
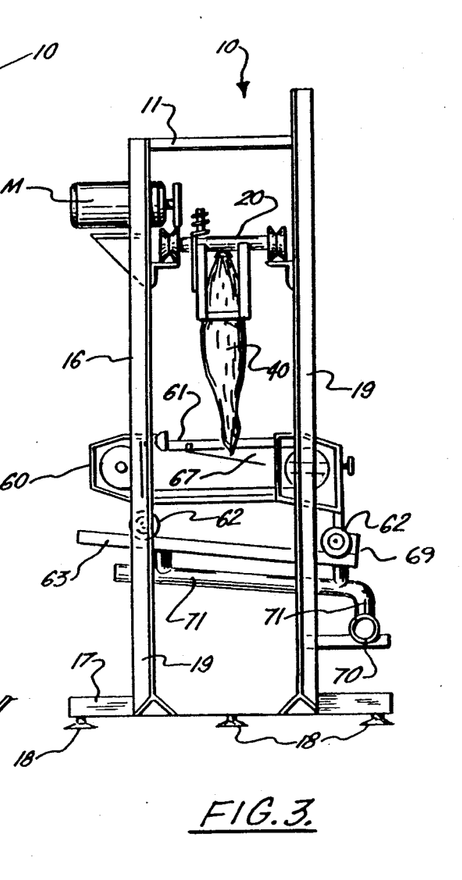
FIG. 3 is a front elevational view of the preferred embodiment of the apparatus of the present invention.

FIGS. 1-3 illustrate generally the preferred embodiment of the apparatus of the present invention designated generally by the numeral 10. FIG. 1 is an overall schematic illustration of an exemplary processing assembly line for tuna. The system boundary is designated, containing therein a number of sequential boxes representing the loading and preparation, washing, and cutting operations in a preferable sequence, as well as boxes which designate washing and return of the carriages which are more fully described hereinafter. In FIGS. 2 and 3, the apparatus includes a plurality of cutting work stations 11-13, each including an upstanding structural support frame 16. It should be understood that while three (3) cutting work stations 11-13 are shown in the drawings for illustration, a larger number of cutting work stations would normally be employed. For example, if each fish section to be cut were one and one-half inches (1½") thick, and if fish bodies being processed (including the head) had lengths of thirty to thirty-six inches (30" to 36"), then about two thirds (⅔) of the total length, or between about twenty to twenty four inches (20" to 24") would be available for separating into transverse sections. The meat from the remaining one third, or head portion, of the fish is processed by another technique. Consequently, a total of approximately ten to thirteen (10-13) cutting work stations might be used to process the twenty to twenty four inches (20" to 24") of the fish body. It will also be appreciated that work stations other than for cutting could also be included. Such additional work stations could provide for other processing or control steps, such as inspecting, washing, or refreezing.

Support frame 16 includes a horizontal runway section, preferably in the form of a pair of spaced apart rails 14. The rails 14 connect to adjacent work stations 11-13 with inclined rail sections 15. It should be understood that the combination of rail sections 14, 15 provide a continuous runway that extends between the work stations 11-13 to define a travel path between the stations so that a moving carriage 20 which is movably mounted upon the rails 14, 15 can traverse the continuous runway from one work station to the next.

Structural frames 16 comprise a plurality of vertical columns 19 that are supported at their lower end portion by a structural base 17 having, for example, a plurality of feet is that can be adjustably attached to the base 17 for leveling each structural frame 16. Structural frame 16 could be manufactured, for example, of any suitable structural material such as structural steel, aluminum, fiberglass, or the like.

Carriage 20 can support a fish body 40 to be processed as it moves between work stations 11-13. Sequential cuts are made in the fish body 40 with cutting assembly 60 as fish body 40 moves through the work stations. Since a large number of work stations 11-13 could be provided such as, for example, ten to twenty (10-20) work stations in series, a transverse fish body section can be cut at each work station from each fish body, one at a time, as the fish body 40 moves from one work station to the next.

In the preferred embodiment, a plurality of cutting assemblies 60 are positioned at a constant elevational position while the elevational position of carriage 20 is constantly lowered from one work station to the next by a dimensional distance equal to the thickness of the transverse fish body section to be cut. For example, the work station 11 shows a rail section 14 which might be, for example, at an elevation of twelve feet (12'). However, when the carriage 20 leaves work station 11 and moves upon inclined rails 15 to work station 12, the carriage is lowered because the runway elevation lowers.

The rails 14 of work station 12 could be, for example, at an elevation of 11 feet 10 inches. Except for the saw kerf loss, this differential of two inches (2") would define a two-inch (2") slab thickness for the transverse fish body section or transverse fish slab to be cut. A plurality of holes H could be provided in column 19, for example, to raise and lower the position of rail sections 14 on any work station so that a selected thickness of transverse fish body sections could be made as desired for each work station.

Figures 6, 6A:
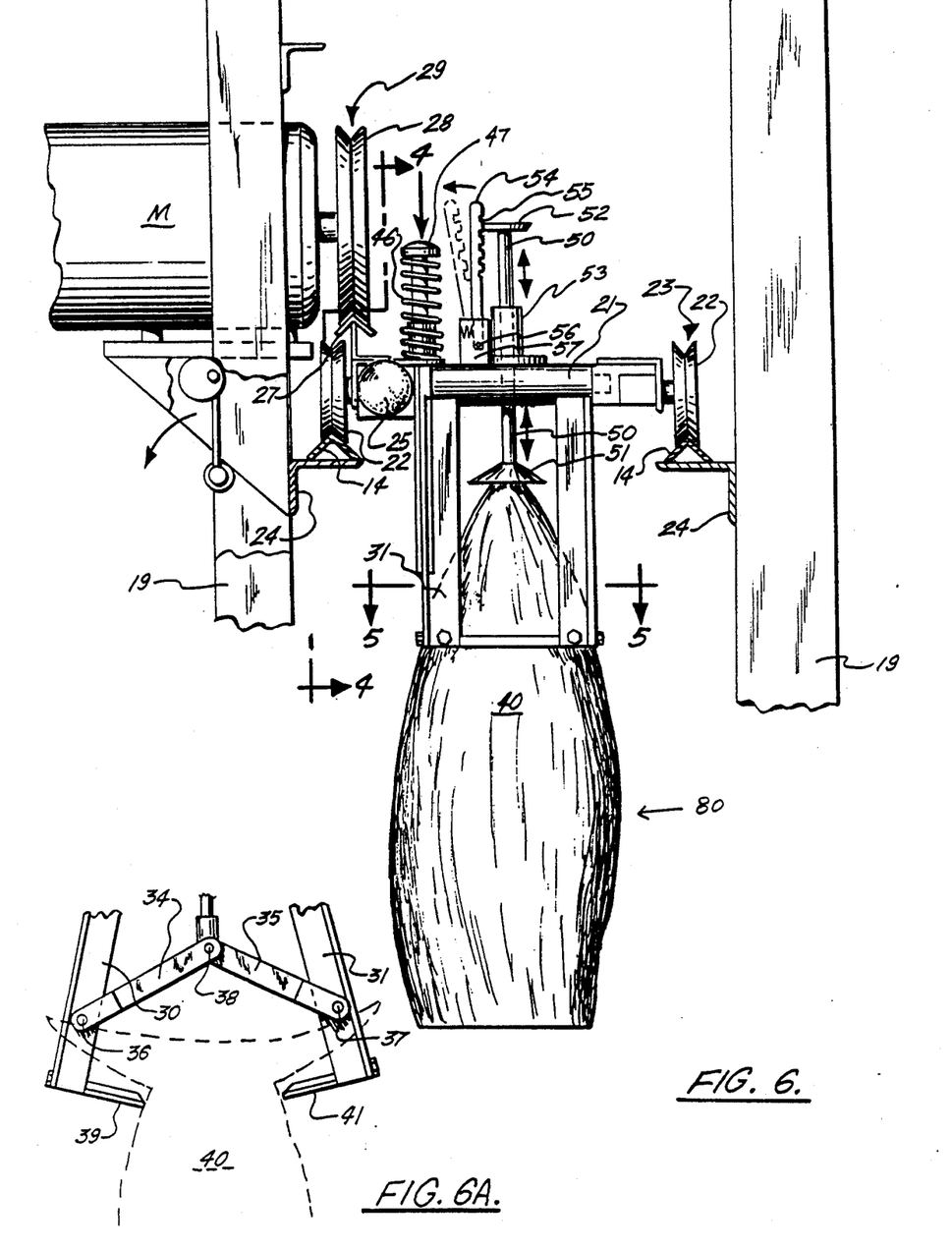
FIG. 6 is a fragmentary elevational view of the preferred embodiment of the apparatus of the present invention illustrating the moving carriage motor drive and runway portions thereof.
FIG. 6A is a fragmentary view of another embodiment of the apparatus of the present invention illustrating the opposed jaw portions in a gripping position upon the tail portion of a fish body.

FIGS. 4–6A and 8A–8B more particularly illustrate the carriage 20 portion of the preferred embodiment of the apparatus of the present invention. Carriage 20 includes a frame 21 having a plurality of wheels 22, each of which is grooved having an annular groove 23. Carriage 20 would typically have either three (3) or four (4) wheels including preferably two (2) rear wheels and either one (1) or two (2) front wheels. Selected wheel(s) could include sufficient axial spacing to allow for turning of carriage 20 about horizontal curves in runway 14, 15. Groove 23 registers with spaced apart rails 14, 15 which are inverted V-shaped as shown in FIG. 6. Each horizontal rail section 14 is supported by angle brackets 24 which are adjustably bolted, for example, to columns 19. The inclined 15 rail sections could also be affixed by bolting, or the like, to the ends of horizontal rail sections 14 thus defining the continuous runway for carriage 20.

Figure 4:
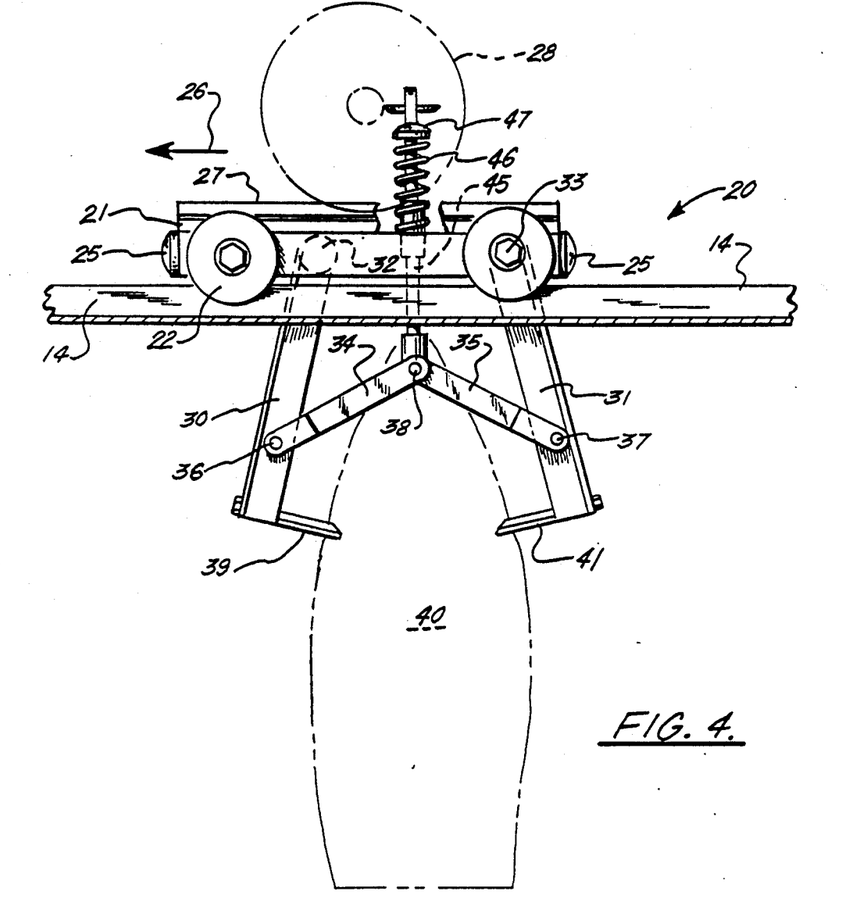
FIG. 4 is a fragmentary elevational view of the preferred embodiment of the apparatus of the present invention illustrating the moving carriage and runway portions thereof.
Figure 5:
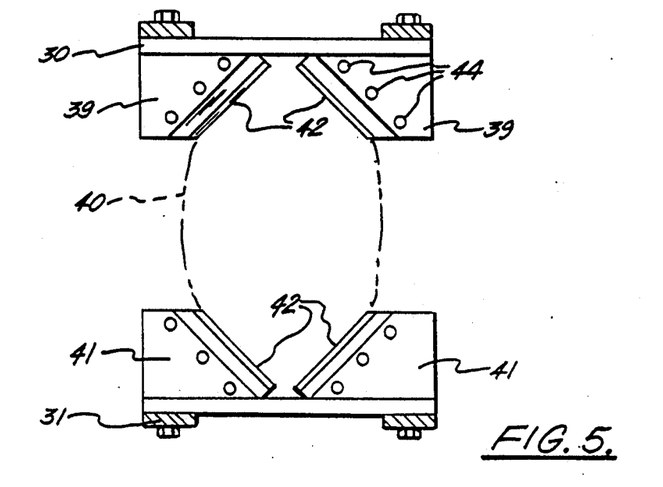
FIG. 5 is a horizontal sectional fragmentary view of the preferred embodiment of the apparatus of the present invention illustrating the opposed jaw portions in gripping position upon the head portion of a fish body.

Since a plurality of moving carriages 20 will preferably be used in operation, each carrying a fish body 40 to be processed, it is very possible that a terminus or terminal end portion of runway 14, 15 would be provided wherein a plurality of moving carriages 20 would stop after the processing of the particular fish body 40 which was carried by that particular moving carriage 20. Each carriage would provide bumpers 25 of resilient material such as rubber, for example, so that the carriages could butt-up against one another at the end portion or terminal portion of the runway 14, 15. In FIG. 4, arrow 26 indicates generally the direction of movement of carriage 20.

Carriage 20 is powered by motor M to move across the horizontal 14 rail sections when the fish body section 40 is in a generally vertical position above cutting assembly 60. As will be apparent, the fish longitudinal axis is vertically positioned and defines a vertical plane during cutting. The carriage frame 21 includes a longitudinally extending inverted angle 27 which registers with grooved wheel 28 having an annular external groove 29 that frictionally engages the upper surface of angle member 27.

Wheel 28 has an annular external groove 29 that frictionally engages the upper surface of angle member 27. Wheel 28 would be driven by a powered electric motor M, for example, at a desired rate and for a desired distance equal to the length of the angle 27.

Saw assembly 60 (FIG. 7) would be positioned generally below motor M and wheel 28 so that a powered movement of carriage 20 upon rails 14 would be provided during the cutting of fish body 40 with cutting assembly 60 to continue to advance as the blade 61 cuts the fish body 40. If the blade 61 (e.g., band saw blade) encounters undue resistance or jams during cutting, the wheel 28 slips on the surface of angled members 27, halting the advance at the blade through the fish body. A bandsaw blade 61 moving in the direction of arrow 70 in FIG. 6 would tend to deflect an unbraced fish body laterally from the travel path in the direction of blade movement 70. The weight of the motor M prevents the carriage 20 holding the fish body 40 from deflecting by maintaining angle member 27 and, thereby, carriage 20 in position by means of the angle member 15 engagement with the grooved wheel 28 attached to the shaft of the motor M. Thus, the carriage is braced to hinder movement of the fish body transverse to the travel path. After a transverse cut is completed, wheel carriage 20 would roll upon inclined section 15 to the next sequential work station 12, 13 as shown by the arrows 26 in FIG. 2.

Fish body 40 is held by a pair of opposed jaws 30, 31 which depend from carriage frame 21 being mounted thereto by pivotal connections 32, 33 respectively (FIG. 4). A pair of links 34, 35 are respectively attached to jaws 30, 31 at pivotal connections 36, 37. Links 34, 35 attach at pivotal connection 38 to rod 45 which is biased to close jaws 30, 31 as spring 46 biases rod 45 to an uppermost position which pulls pivot 38 and links 34, 35 upwardly. It should also be noted that the arrangement of links 34 and 35 is such that jaws 30 and 31 grip a large fish with more force than a small one.

The upper end portion of rod 45 includes a surface 47 such that pressure can be applied as shown by the vertical arrow in FIG. 6 to the convex surface 47 overcoming the bias of spring 46 and lowering rod 45 which causes the links 34, 35 to push jaw assemblies 30, 31 apart. Each jaw assembly 30, 31 is provided with a plurality of metallic blades 42 attached to jaw assemblies 30, 31 by means of insulators 39, 42, preferably plastic blocks. A plurality of bolts 44, for example, can be used to secure each blade 42 to its respective heat insulative plastic block 39, 41. Bolts 44 can also be used to secure block 39, 41 to jaws 30, 31.

Because the blades are warmer initially than the fish 40, they thaw the fish at its surface, allowing the blades 42 initially to bite into the fish body 40. However, as heat transfer rapidly occurs from the blades 42 to the frozen fish body section 40, the blades quickly lower in temperature and the fish body 40 refreezes at the points of contact with the blades 42 to provide a tight grip between jaw assemblies 30, 31 and fish body 40. The insulating plastic blocks 39 prevent excess heat transfer to the fish body beyond that heat transferred from the blades 42. The blades do not bite so deeply as to create severe damage to the fish body 40. It has also been found that the use of smooth blades instead of serrated blades in the jaws results in the fish automatically moving into alignment with the jaws for correct clamping.

In apparatus suitable for manual operation, a vertical rod 50 is mounted at the central portion or carriage frame 21 being vertically movable with respect to frame 21 through bushing 53. A pair of spaced apart flanges 51, 52 are mounted at the end portions of vertical rod 50, the flange 51 normally defining a stop for the upper end portion of fish body 40 and the flange 52 interlocking with notches 55 of pivotally attached, spring-loaded locking arm 54. Arm 54 is pivotally attached to frame 21 at pivot 56 and is preferably spring loaded towards an engaging position with the flange 52 by means of spring 57. Thus, the locking arm 54 would normally engage the flange 52 in one of the notches 55 so that the elevational position of rod 50 can be determined by the registration of flange 52 into one of the vertically spaced notches 55 upon locking arm 54. The double arrows in FIG. 6 indicate the vertical movement of rod 50 with respect to frame 21 through an opening in bushing 53.

It should be appreciated, of course, that the step of gripping or clamping the fish head may be at least partially automated. But in the event of such automation, nose-stop flange 51 and its entire assembly could be part of the loading station instead of part of each individual carriage.

Figure 7:
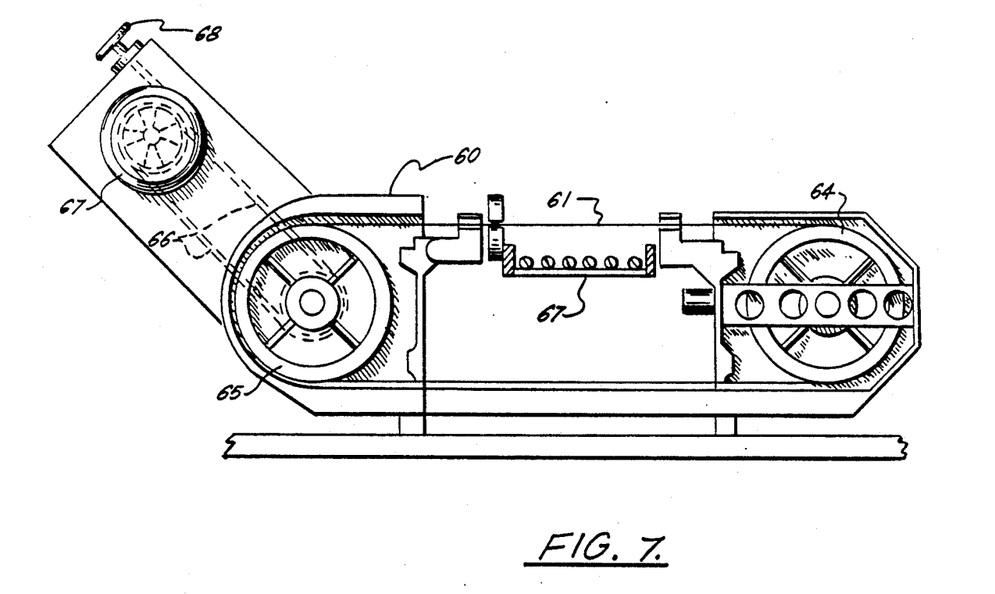
FIG. 7 is a fragmentary elevational view of the preferred embodiment of the present invention illustrating the cutting station portion thereof.
Figure 8A:
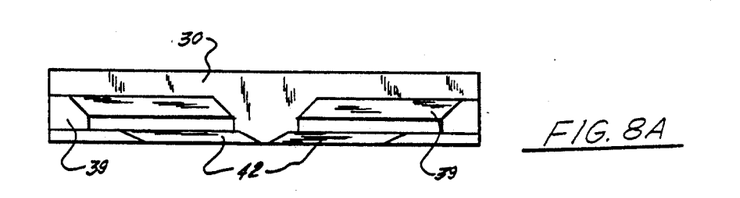
FIGS. 8A and 8B are fragmentary side and top plan views of the jaw portions of the present invention.
Figure 8B:
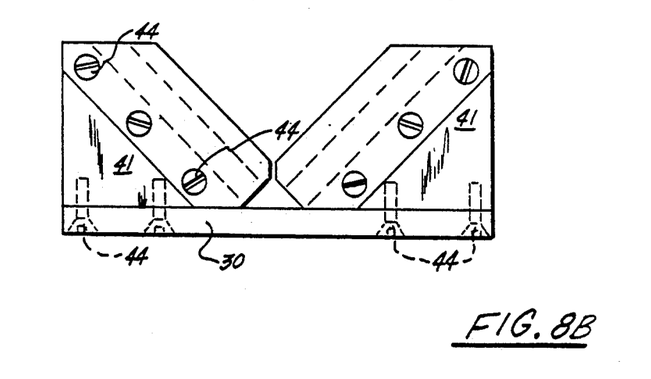

FIG. 7 illustrates the cutting assembly 60 as including an elongated endless band saw 61 rotatably mounted upon a pair of spaced apart pulleys 64, 65. The pulley 65 is driven by belt 66 which engages electric motor 67. A speed-adjusting mechanism 68 which is commercially available can be used to adjust the speed of belt 66. It would also be appreciated, of course, that band saw 61 may be designed as a direct drive say, rather than using belt 66 and speed-adjusting mechanism 68. Cutting assembly 60 would be mounted upon a wheeled frame having a plurality of wheels 62 registering upon inclined rails 63 (FIG. 2).

A stop 69 defines the position of cutting assembly 60 upon rails 63. In the preferred embodiment, the elevational position of each cutting assembly 60 for each work station 11-13 would be the same. Thus, as the carriage 20 is lowered from one work station 11 to the next work station 12 as shown in FIG. 2, the fish body section is likewise lowered so that an additional slab or transverse section is cut from the lowest portion of the fish body 40 remaining. Thus at the work station 11, the lowermost tail portion of fish body 40 will be cut and has in fact been removed as illustrated by the fish body section shown at work station 12. Adjustment holes H in columns 19 allow elevational adjustment of rails 14 upon columns 19. Of course, means for cutting other than a bandsaw, such as, for example, straight, angled, curved blades or circular saws, are also within the scope of the invention.

A generally inclined drain header 70 extends between the work stations 11-13 and connects to downwardly extending discharge ports 71, 72, 73. Arrows 74 in FIG. 2 illustrate the removal of trash, debris, cuttings and the like from the work area through header 70.

In the method of the present invention, the fish bodies may typically be preliminarily graded or sorted into groups of substantially similar size and weight. In this manner, uniform transverse fish sections are deposited at each respective work station.

The method of processing a fish body into a plurality of transverse fish body sections further include the steps of movably supporting the fish body and cutter with respect to each other upon a frame and along a first path of travel. A transverse cut is made through the fish body section as the fish body section and cutter move relative to each other along the first path. The cutter and fish body positions are adjusted relative to one another and the fish body section is moved relative to the cutter upon the frame along a second path that transverses the cutting blade so that the second transverse cut is made, spaced from the first cut. The method preferably includes the moving of the fish through a plurality of spaced apart work stations. Since the fish to be processed are preferably graded into groups of fish of substantially similar size and weight, it follows that transverse sections of substantially similar size and configuration will gather at each respective work station.

It should also be understood that the described preferred embodiment discloses gripping the fish at the head and initiating the transverse cuts at its tail portion of the fish. This approach has been found to be advantageous since it allows the fish to be gripped sufficiently tight to resist the cutting forces without additional support mechanisms. However, satisfactory results have also been achieved by holding the fish by its tail and initiating the transverse cuts at the head portion of the fish.

The foregoing description of the invention is illustrative and explanatory thereof, and various changes in the size, shape and materials, as well as in the details of the illustrated construction may be made without departing from the spirit of the invention.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for processing a frozen elongated fish body, with a longitudinal axis extending from the fish head to tail, into a plurality of transverse fish body sections comprising:
   a) support frame defining a work station;
   b) holding means for supporting a fish body to be processed with respect to the work station;
   c) cutting means positioned adjacent the frame for making a transverse cut through the fish body to be processed;
   d) the work station having moving means for transporting the holding means and cutting means with respect to each other between first and second positions and along a travel path which traverses the fish body across the cutting means so that a transverse cut can be made at a desired position on the fish body with the cutting means; and
   e) means for sequentially positioning the fish body and the cutting means with respect to each other to form a desired number of sequential cuts of the fish body, so that multiple and sequential transverse cuts of substantially equal spacing can be made at various positions along the same fish body being processed to produce transverse fish body sections of substantially uniform thickness.

2. An apparatus for processing a frozen elongated fish body, wit a longitudinal axis extending from the fish head to tail, into a plurality of transverse fish body sections comprising:
   a) support frame defining a work station;
   b) holding means for supporting a fish body to be processed with respect to the work station;
   c) cutting means positioned adjacent the frame for making a transverse cut through the fish body to be processed;
   d) the work station having moving means for transporting the holding means and cutting means with respect to each other between first and second positions and along a travel path which traverses the fish body across the cutting means so that a transverse cut can be made at a desired position on the fish body with the cutting means; and e) means for positioning the fish body and the cutting mean with respect to each other so that multiple transverse cuts of substantially equal spacing can be made at various positions along the same fish body being processed to produce transverse fish body sections of substantially uniform thickness wherein the positioning means can adjust the distance between the cutting means and holding means so that sequential cuts at various positions can be made to the same fish body.

3. The apparatus of claim 1, wherein the moving means includes an engagement between the holding means and moving means such that the fish body continuously advances without displacement transverse to the travel path while the transverse cut is made in the fish body.

4. The apparatus of claim 1, wherein the moving means includes an engagement between the holding means and the moving means such that the moving means slips with respect to the holding means to prevent advancement of the fish body in the event of sufficient resistance to cutting while the transverse cut is made in the fish body.

5. The apparatus of claim 1, wherein the work station includes multiple spaced apart frames.

6. The apparatus of claim 5, wherein the cutting means includes a plurality of cutting blades mounted respectively upon the plurality of frames.

7. The apparatus of claim 5, wherein the moving means includes a runway and the holding means is mounted for travel upon the runway.

8. The apparatus of claim 1, wherein the holding means comprises a holder with spaced apart jaws for gripping the fish body.

9. The apparatus of claim 7, wherein the holder comprises blades for contacting the fish body and means positioned between the blades and the spaced apart jaws for thermally insulating the fish body from the spaced apart jaws.

10. An apparatus for processing a fish body into a plurality of transverse fish body sections, comprising:
   a) a plurality of spaced apart work stations, each including structural support frame;
   b) a continuous runway defining a travel path through the stations;
   c) a plurality of holders mounted for travel upon the runway so that the holders can traverse the runway, the holders supporting the fish body to be processed so that the fish body can travel along the runway;
   d) cutting means included at selected work stations for making transverse cuts of equal spacing across the fish body section as it travels the runway; and
   e) alignment means for adjusting the fish body and cutting means with respect to each other into a plurality of different sequential positions as the fish body progresses on the runway into different sequential positions that allow the cutting means to sever transverse fish body sections of equal thickness from the fish body.

11. The apparatus of claim 10, wherein the carriage and the holders support the fish body for movement in a first plane and the cutting means makes a transverse cut that defines a second plane at right angles to the first plane.

12. The apparatus of claim 10, wherein the fish body is supported in a position that advances the fish body to the cutting means for travel with a portion of the fish body advancing to the cutting blade so that a transverse cut of desired thickness is automatically formed as the fish is advanced.

13. The apparatus of claim 10, wherein there is further provided means for bracing the fish body and cutting means with respect to each other during cutting of the fish body to prevent movement of the fish body out of the first plane.

14. The apparatus of claim 10, wherein the holders include clamping jaw means for clamping the exterior of the fish body on generally opposite sides.

15. The apparatus of claim 10, wherein the cutting means is at least one blade.

16. The apparatus of claim 10, wherein the cutting means is a rotary band saw.

17. An apparatus for processing a fish body into a plurality of transverse fish body sections, comprising:
   a) a plurality of work stations;
   b) a runway extending between the work stations to define a travel path between the work stations;
   c) a plurality of spaced apart holders, each movably supported upon the runway;
   d) each holder including a pair of opposed jaws supporting the fish body to be processed so that the fish body can travel the runway while held by the jaws;
   e) cutting means positioned to make transverse cuts from each fish body that travels the runway in a holder.

18. A method of processing a fish body into a plurality of transverse fish body sections comprising the steps of:
   a) movably supporting a fish body and a cutter with respect to each other upon a runway and along a path of travel;
   b) making sequential, substantially equally spaced transverse cuts through the fish body as the fish body is advanced on the runway along the path; and
   c) adjusting the cutter and fish body positions relative to one another between each transverse cut.

19. The method of claim 18 further comprising the step before step "a" of preliminarily grading a plurality of fish to be processed into groups of substantially similar size.

20. The method of claim 18 wherein in step "a", the fish body is moved relative to the cutter.

21. A method for processing a fish body into transverse fish body sections comprising the steps of:
   a) holding the fish body with a mechanical holder for gripping the fish;
   b) traversing the fish body with a cutter at generally right angles to the longitudinal axis of the fish body to form a transverse cut at a first position along the fish body;
   c) sequentially advancing the fish body and with respect to the cutter during a traversing of the fish body with the cutter; and
   d) changing the distance between the mechanical the transverse cut position defines equally spaced transverse cuts from one end of the fish body to the other to generate transverse fish body sections of substantially equal thickness.

22. A method of processing a fish body with a longitudinal axis extending from its head to its tail into multiple transverse fish body sections comprising the steps of:

a) movably supporting the fish body with a mechanical holder in a position which maintains its longitudinal axis in a first plane;
b) defining a second plane with a powered cutter that is perpendicular to the first plane and which includes a cutting line;
c) moving the fish body and cutter relative to one another so that the fish body traverses the cutting line to form a transverse cut through the fish body; and
d) precisely guiding the mechanical holder and cutter with respect to each other during cutting with a support frame that maintains the holder in the first plane and the cutter in the second plane; and
e) sequentially readjusting the fish body and cutter positions by equal distances so that uniform thickness transverse fish body sections are produced.

* * * * *